United States Patent [19]

Michelson

[11] Patent Number: 5,341,572
[45] Date of Patent: Aug. 30, 1994

[54] HYDRAULIC PRUNING TOOL

[76] Inventor: Yigal Michelson, 3 Hashkedim, 37000 Pardes Hanna, Israel

[21] Appl. No.: 29,508

[22] Filed: Mar. 11, 1993

[51] Int. Cl.$^5$ ............................................. B26B 15/00
[52] U.S. Cl. ...................................... 30/228; 30/249; 91/464
[58] Field of Search ............... 91/464, 417 R, 47, 428, 91/461, 401; 30/228, 180, 277.4, 249, 194, 245

[56] References Cited

U.S. PATENT DOCUMENTS

| | | | |
|---|---|---|---|
| 2,751,940 | 6/1956 | Miller | 30/228 |
| 3,476,015 | 11/1969 | Ackley | 91/401 |
| 3,854,204 | 12/1974 | Gonzales, Jr. | 30/228 |
| 3,922,782 | 12/1975 | Lind | 30/228 |
| 4,109,381 | 8/1978 | Pellenc | 30/228 |

Primary Examiner—Richard K. Seidel
Assistant Examiner—Hwei-Siu Payer
Attorney, Agent, or Firm—Mark M. Friedman

[57] ABSTRACT

A hydraulic tool, such as might be used to prune trees, for alternately producing a relatively strong power stroke and a relatively weak reset stroke, which includes a reciprocating member within a housing and a hydraulic system made up of two chambers. The first chamber has an effective projected area relative to the reciprocating member and is hydraulically connected to the outlet. The second chamber has an effective projected area relative to the reciprocating member which is smaller than that of the first chamber. The second chamber is hydraulically connected to the inlet only during the power stroke, and is hydraulically connected to the first chamber only during the reset stroke and during the time between the end of the reset stroke and the beginning of the next power stroke. In this way, during the power stroke the reciprocating member is forced in one direction, so as to activate the pruning head, while during the reset stroke the back pressure of the system is used to urge the reciprocating member in the opposite direction so as to open, or reset, the pruning tool.

8 Claims, 3 Drawing Sheets

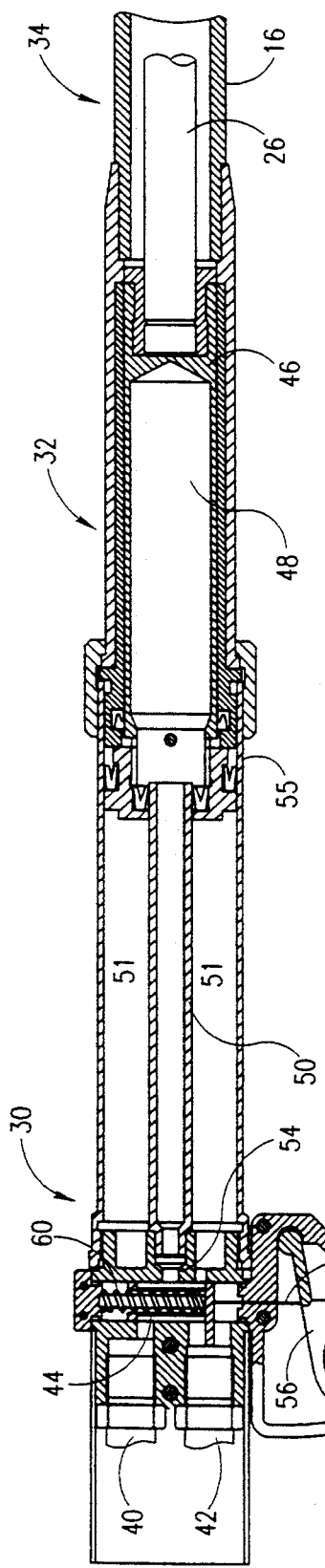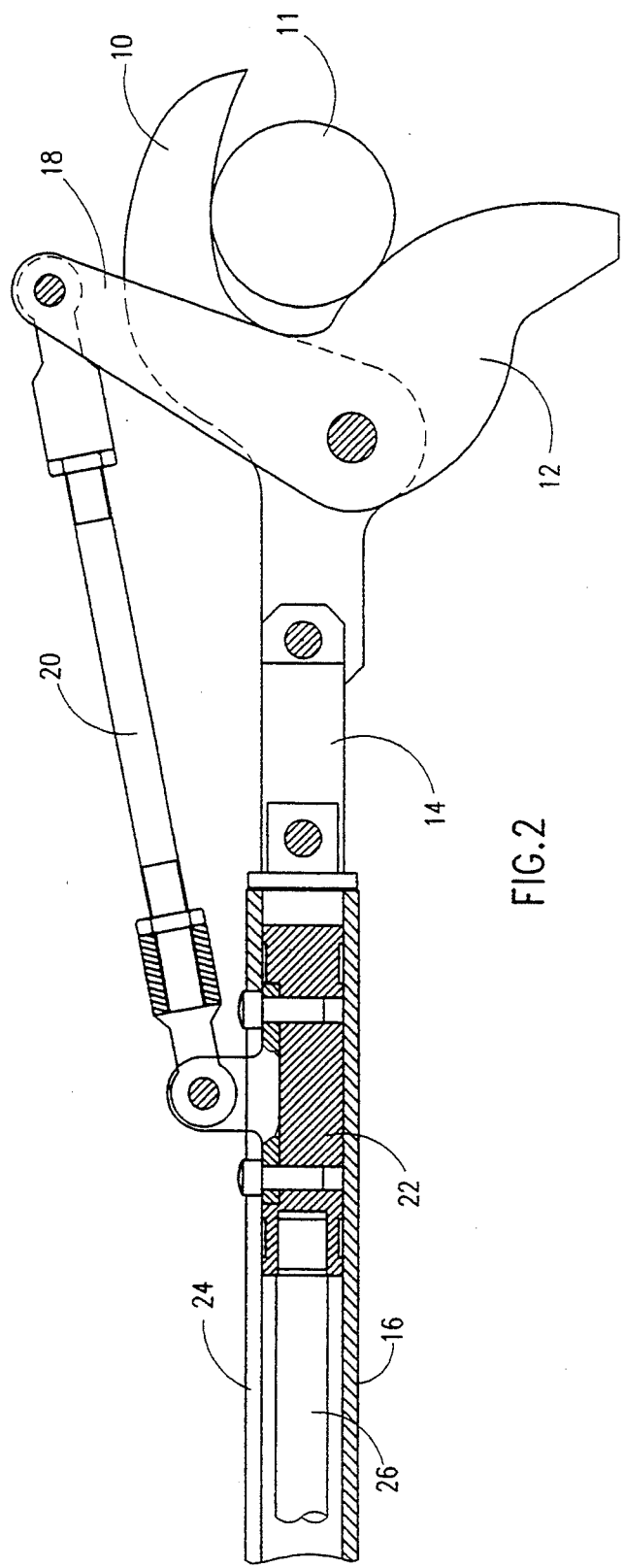

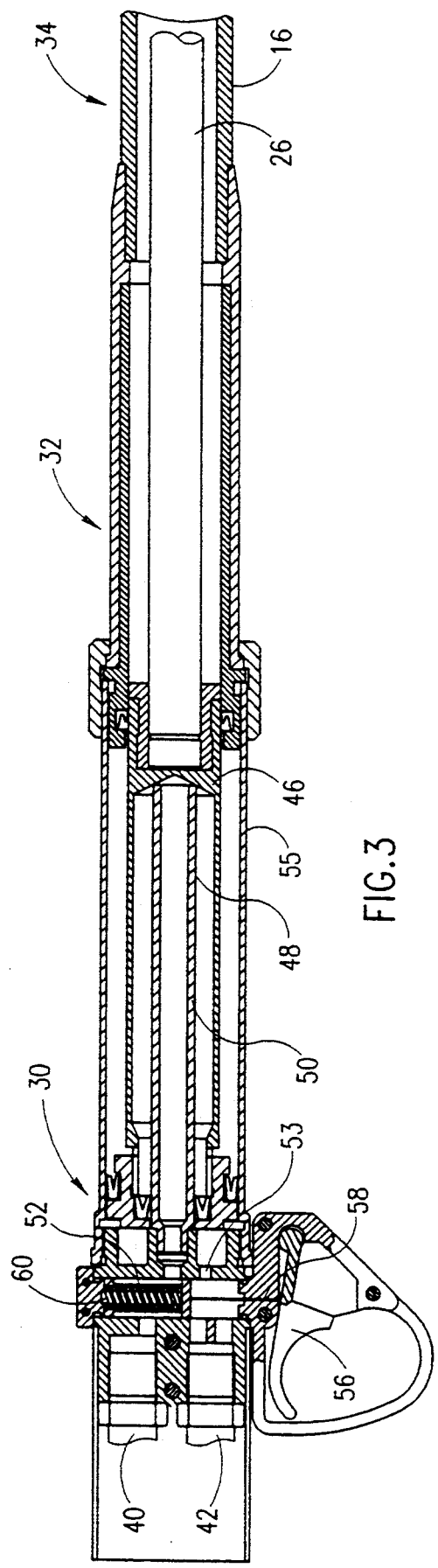
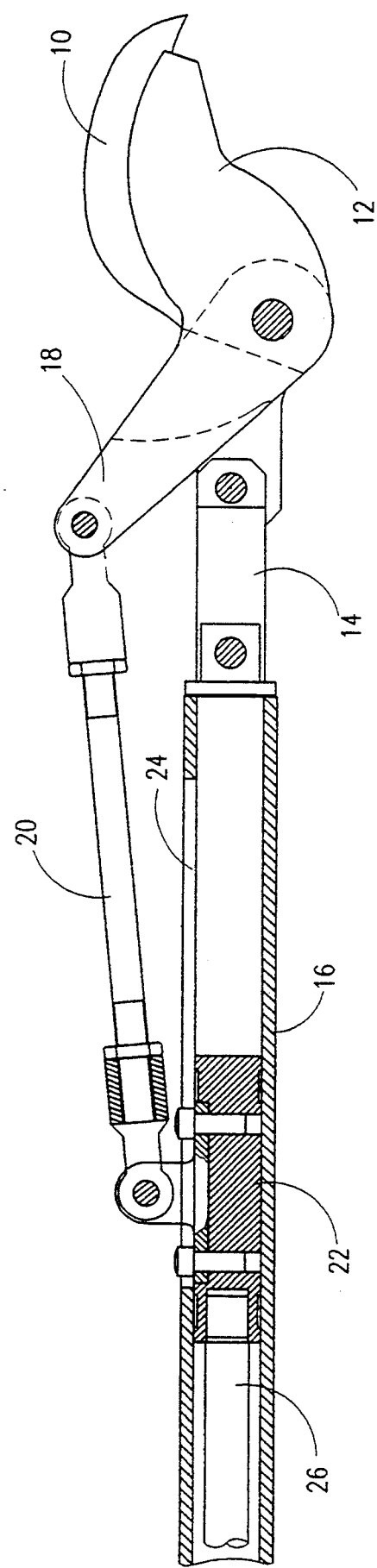

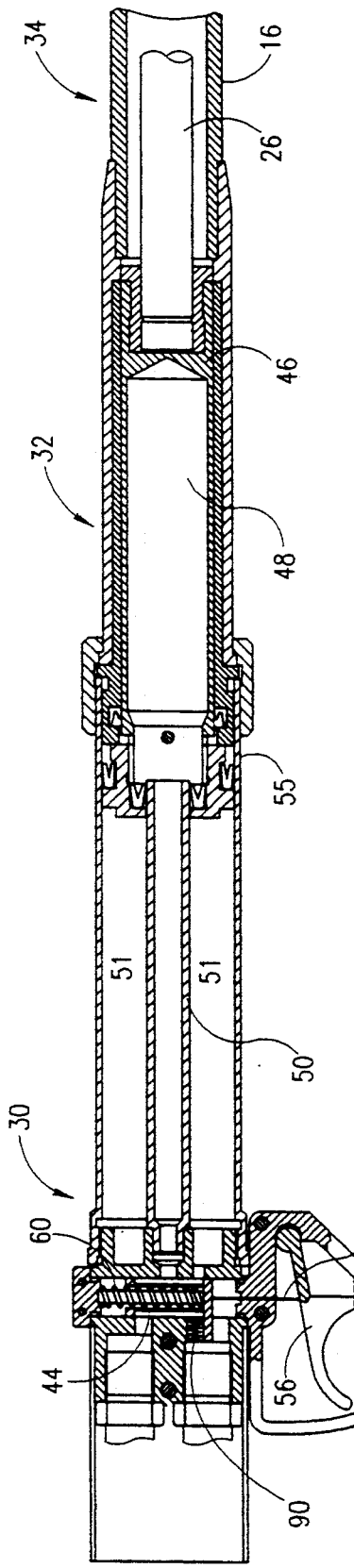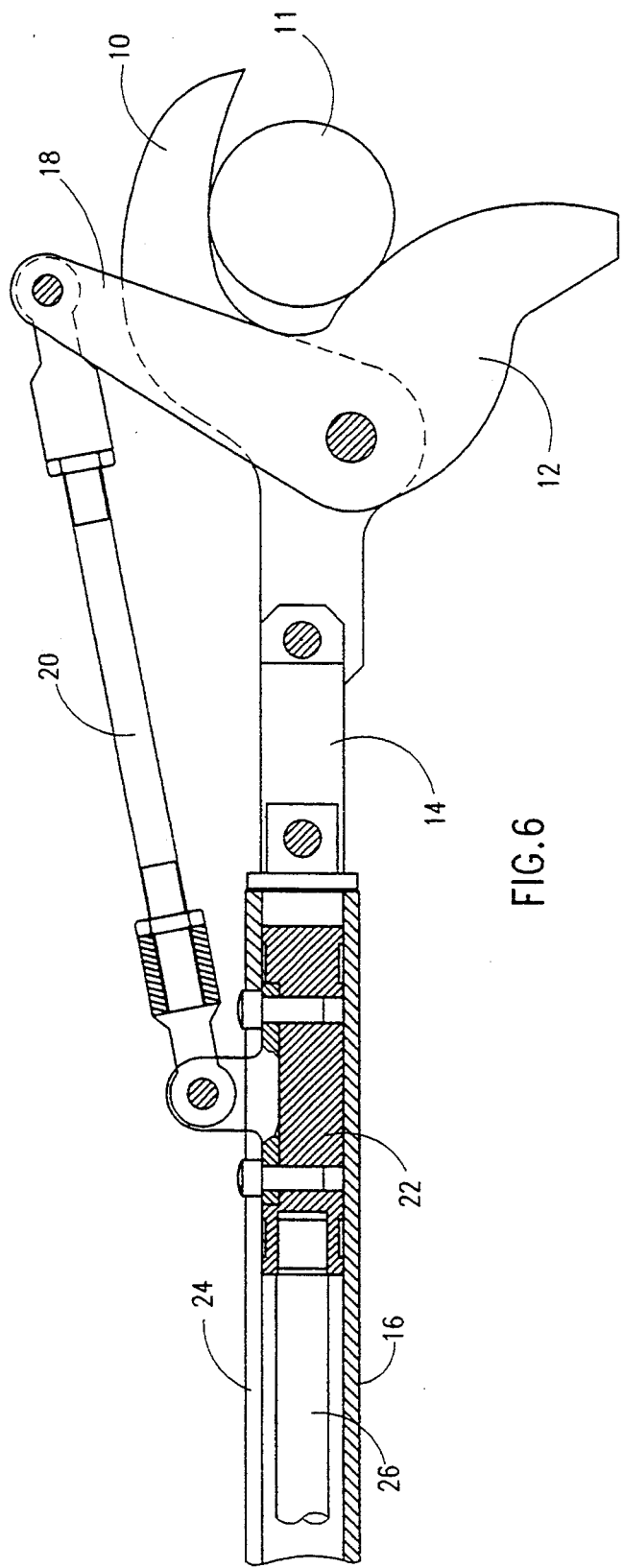

HYDRAULIC PRUNING TOOL

FIELD AND BACKGROUND OF THE INVENTION

The present invention relates to pruning tools and, more particularly, to hand-held pruning tools which are hydraulically operated.

The present invention relates more generally to hydraulically operated tools which use two strokes, a powerful stroke (hereinafter referred to as the "power stroke") requiring a relatively large force, and a relatively weak stroke, typically used to reset the device so that it is ready for the next powerful stroke (hereinafter referred to as the "reset stroke"). For ease of exposition, and without in any way limiting the scope of the present invention, the descriptions and illustrations included herein are confined to a hydraulic pruning tool.

Pruning tools are widely used in agriculture and forestry, as well as in private gardens, to trim and shape trees, shrubs, and the like.

A typical pruning tool includes a cutting head, which typically includes a scissors-like mechanism made up of two pivotally connected blade members, and a handle which allows the operator to bring the cutting head to the appropriate location and to activate the cutting head.

The scissors-like portion of the cutting head of a typical pruning tool is normally in the open position, with the distance between the two blades defining the size of the largest branch or limb which can be cut by the tool. In operation, the cutting head is maneuvered so that a limb is admitted between the blades, at which point the operator activates the cutting head, forcing together the two blade members so as to cut a branch or limb. The amount of force needed to cut a branch depends on a number of factors, including, but not limited to, the size and nature of the limb being cut.

Once a limb has been cut, additional force, typically of much lower magnitude than the cutting force, must be applied to the cutting head in order to separate the blades and prepare the cutting head to receive the next limb to be cut.

Various means may be used to power the cutting action, or power stroke, of the cutting head. These can range from manual force supplied by the fingers and/or hand of the operator, to an electrical motor, to a suitable internal combustion engine or to pneumatic or hydraulic mechanisms, among others.

The same or related means may be used to supply the relatively small force needed to reopen the cutting head blades following the cutting action during the reset stroke. Such a force may alternatively be supplied by various spring, or other, biasing mechanisms.

In various heavy-duty pruning applications, hydraulic systems have become the power source of choice. Hydraulically operated pruning tools are typically preferred over pneumatic tools since the pressures generated by hydraulic tools can be 10 to 15 times larger than those achieved with compressed air. This allows a hydraulic tool to be more compact, lighter and more powerful than its pneumatic counterpart. Furthermore, a hydraulic tool using oil needs less maintenance since it is self-lubricating.

A variety of hydraulic pruning tools are available. Typically, the reset stroke of such tools is powered by one of two basic means. In one type of device, a double acting hydraulic piston is used to actively alternately drive the power stroke and the reset stroke. Such an arrangement is relatively complicated and expensive to build and maintain. Furthermore, such as system is inefficient, since energy must be actively supplied for the resetting of the tool.

In another type of device, a spring mechanism or similar biasing mechanism, is provided to force the blades apart once the power stroke is over. Such mechanisms involve certain inefficiencies in that during the power stroke additional energy, beyond that required for the actual cutting of the limb, has to be expended to overcome the biasing force of the spring. Furthermore, because of the back pressure in the system, a spring mechanism is typically slow to operate, which could reduce the overall efficiency of the pruning operations. Finally, spring mechanisms may suffer from non-uniformities in their elasticities over the length of the spring and/or with time, which could require significant maintenance.

There is thus a widely recognized need for, and it would be highly advantageous to have, a relatively uncomplicated and low maintenance hydraulic pruning tool, or similar device, which would quickly and efficiently reset, or open, the cutting head of the tool without relying on double-acting pistons or spring-like mechanisms.

SUMMARY OF THE INVENTION

According to the present invention there is provided a hydraulic tool for alternately producing a relatively strong power stroke and a relatively weak reset stroke, comprising: (a) a housing; (b) a reciprocating member slidable within the housing such that during the power stroke the reciprocating member slides in a first direction and during the reset stroke the reciprocating member slides in a direction which is opposite the first direction; (c) a hydraulic inlet; (d) a hydraulic outlet, the outlet being hydraulically connected to the inlet during the reset stroke and during the time between the end of the reset stroke and the beginning of the next power stroke, the outlet being hydraulically disconnected from the inlet during the power stroke; (e) a first chamber, having a first chamber effective projected area relative to the reciprocating member, the first chamber being hydraulically connected to the outlet; and (f) a second chamber, having a second chamber effective projected area relative to the reciprocating member which is smaller than the first chamber effective projected area, the second chamber being hydraulically connected to the inlet and hydraulically disconnected from the outlet during the power stroke, the second chamber being hydraulically disconnected from the first chamber during the power stroke and hydraulically connected to the first chamber during the reset stroke and during the time between the end of the reset stroke and the beginning of the next power stroke, such that during the power stroke the reciprocating member is urged in the first direction and during the reset stroke the reciprocating member is urged in a direction which is opposite that of the first direction.

Further according to the present invention there is provided a hydraulic tool for alternately producing a relatively strong power stroke and a relatively weak reset stroke, comprising: (a) a housing; (b) a reciprocating member slidable within the housing such that during the power stroke the reciprocating member slides in a first direction and during the reset stroke the reciprocating member slides in a direction which is opposite the first direction; (c) a hydraulic inlet; (d) a hydraulic outlet; (e) a first chamber, having a first chamber effective projected area relative to the reciprocating member, the first chamber being hydraulically connected to the outlet during the power stroke and hydraulically disconnected from the outlet and hydraulically connected to the inlet during the reset stroke and during the time between the end of the reset stroke and the beginning of the next power stroke; and (f) a second chamber, having a second chamber effective projected area relative to the reciprocating member which is smaller than the first chamber effective projected area, the second chamber being hydraulically connected to the inlet, the second chamber being hydraulically disconnected from the first chamber during the power stroke and hydraulically connected to the first chamber during the reset stroke and during the time between the end of the reset stroke and the beginning of the next power stroke, such that during the power stroke the reciprocating member is urged in the first direction and during the reset stroke the reciprocating member is urged in a direction which is opposite that of the first direction.

According to further features in preferred embodiments of the invention described below, the hydraulic tool further includes a suitable head, such as a pruning head, which is connected to, and is driven by, the reciprocating member.

According to still further features in the described preferred embodiments, the pruning head is designed so that the branch or limb to be cut is located along the centerline of the arm supporting the pruning head.

According to yet further features in the described preferred embodiments, the pruning head can be rotated with respect to the housing which is held in the hand of the operator.

The present invention successfully addresses the shortcomings of the presently known configurations by providing a hydraulic tool, such as a pruning device, which alternately provides a powerful stroke, such as is needed to cut a tree limb, and a weaker stroke, such as is needed to reset the pruning tool. The weaker stroke is produced by taking advantage of the back pressure present in the system, without the need for costly and wasteful double-acting pistons or slow, unreliable and inefficient springs, and related biasing mechanisms.

BRIEF DESCRIPTION OF THE DRAWINGS

The invention is herein described, by way of example only, with reference to the accompanying drawings, wherein:

FIG. 1 is a cross sectional side view of the rear portion of a tool according to the present invention, using an open hydraulic system, prior to the beginning of the power stroke;

FIG. 2 is a cross sectional side view of the front portion of a tool whose rear portion is depicted in FIG. 1;

FIG. 3 is a cross sectional side view of the rear portion of a tool as in FIGS. 1 and 2 at the end of the power stroke;

FIG. 4 is a cross sectional side view of the front portion of a tool whose rear portion is depicted in FIG. 3;

FIG. 5 is a cross sectional side view of the rear portion of another embodiment of a tool according to the present invention, using a closed hydraulic system, prior to the beginning of the power stroke;

FIG. 6 is a cross sectional side view of the front portion of a tool whose rear portion is depicted in FIG. 5.

DESCRIPTION OF THE PREFERRED EMBODIMENTS

The present invention is of a hydraulic pruning tool, or similar tool, which takes advantage of the hydraulic back pressure to provide for the fast and efficient resetting of the tool after it has cut a limb.

The principles and operation of a hydraulic pruning tool according to the present invention may be better understood with reference to the drawings and the accompanying description.

Referring now to the drawings, FIGS. 1 and 2 illustrate the back and front portions, respectively, of a typical pruning tool according to the present invention.

It is to be noted that the entire device is normally a single elongated structure of appropriate length, which length is dictated by the nature of the application. For ease of presentation, each of the three tools depicted in the drawings has been cut into a front and a back section, with an intermediate section of undetermined length being omitted in each case, the absence of such section being indicated by wavy lines at the front end of the back section and at the back end of the front section. For convenience, the front and back sections corresponding to a single tool have been placed side by side on a single drawing sheet.

Shown in FIGS. 1 and 2 and in FIGS. 3 and 4 are various depictions of a single basic embodiment of an open system hydraulic pruning tool according to the present invention. The system is shown before the start of the power stroke (FIGS. 1 and 2) and at the end of the power stroke (FIGS. 3 and 4). An open system is characterized in that the hydraulic inlet and outlet are in hydraulic communication with each other except during the power stroke, as will be described in more detail below.

FIGS. 2, 4 and 6 depict a typical front section of a pruning tool. It is again to be noted that a pruning tool is used for illustrative purposes only and that references to pruning tools are not intended to limit the scope of the present invention to a specific pruning tool or to pruning tools in general.

The illustrative pruning head shown in the Figures includes a pair of blades 10 and 12. Blade 10 is rigidly connected to an extension member 14 which is, in turn, rigidly connected to a hollow and partly slotted pruning head support pipe 16, described in more detail below.

Blade 12, which, when in use along with blade 10, serves to cut a branch or limb 11, is pivotally connected to blade 10 and is rigidly connected to a blade arm 18. Preferably, the center of branch or limb 11 lies on the centerline of pruning head support pipe 16. Such placement reduces various undesired stresses and torques on the system which would occur were branch or limb 11 not located on the centerline as described. Blade arm 18 is pivotally connected at its opposite end to a blade rod 20, which is, in turn, pivotally mounted at its opposite end to a slidable carriage 22.

Slidable carriage 22 can slide back and forth within pruning head support pipe 16 with that portion of slidable carriage 22 which connects to blade rod 20 projecting out of pruning head support pipe 16 through a slot 24 of suitable dimensions in one portion of pruning head support pipe 16.

Slidable carriage 22 is connected at its posterior side to a reciprocating rod 26 which is driven by a hydraulic system described below. Preferably, the connection between slidable carriage 22 and reciprocating rod 26 is such that slidable carriage 22 is axially rotatable about reciprocating rod 26, which allows the pruning head to be rotated during operation, as described below.

As can be seen from FIGS. 2, 4 and 6, whenever reciprocating rod 26 is in its anterior-most position (FIGS. 2 and 6), blades 10 and 12 are urged apart, or are in their reset position, while when reciprocating rod 26 is in its posterior-most position (FIG. 4), blades 10 and 12 come together so as to cut branch or limb 11.

The present invention is primarily directed not at the pruning head itself (FIGS. 2, 4 and 6) but rather at the hydraulic system used to power the operating head, or pruning head (FIGS. 1, 3, and 5). FIGS. 1 and 3 depict an open hydraulic system, while FIG. 5 depicts a closed hydraulic system which is very similar to the open system, which is next described in detail.

With reference to FIG. 1, and for ease of presentation, the back portion of the tool can be broken into three parts—a posterior handle section 30, an intermediate swivel section 32 and a forward extension section 34. Extension section 34 includes the posterior portion of pruning head support pipe 16 with its reciprocating rod 26. Pruning head support pipe 16 is preferably rigidly connected to the anterior portion of swivel section 32. The posterior portion of swivel section 32 is, in turn, preferably rotatably connected to the anterior portion of handle section 30.

Such an arrangement makes it possible for the user to grasp handle section 30 in one hand and swivel section 32 in the other. Since swivel section 32 is rotatable relative to handle section 30 the user is then free to rotate swivel section 32, and therefore also extension section 34 and the pruning head, which are all rigidly connected, in order to put the pruning head in the proper orientation for admitting a branch or limb, without having to also rotate handle section 30. The rotatable connection between reciprocating rod 26 and slidable carriage 22, described above, makes it possible to rotate the pruning head without also having to rotate handle section 30.

The gist of the present invention lies in the hydraulic system used to activate the pruning head. An illustrative embodiment of such a system is described next with reference to FIGS. 1 and 3.

The system includes an inlet 40 and an outlet 42 for hydraulic medium. In the open hydraulic system shown in FIGS. 1 and 3, inlet 40 and outlet 42 are hydraulically connected to each other through a inlet/outlet bypass 44 during the reset stroke and during the time between the end of the reset stroke and the beginning of the next power stroke. Inlet 40 and outlet 42 are hydraulically disconnected from each other only during the power stroke.

The posterior end of reciprocating rod 26 is connected to a slidable piston 46 which includes a piston reservoir 48 having a posteriorly-facing opening which is large enough to accommodate an axial inlet pipe 50 fixedly mounted in handle section 30. The dimensions of piston reservoir 48 and axial inlet pipe 50 are such that when reciprocating rod 26 is in its anterior-most position (blades 10 and 12 apart, FIGS. 1 and 2) the anterior end of axial inlet pipe 50 is sealingly engaged within the posterior portion of piston reservoir 48 while when reciprocating rod 26 is in its posterior-most position (blades 10 and 12 together, FIGS. 3 and 4) axial inlet pipe 50 is substantially entirely enclosed within piston reservoir 48.

The posterior end of axial inlet pipe 50 can be alternately connected to inlet 40 through an inlet/axial inlet pipe channel 52 and to another hydraulic chamber, to be described below, through a chamber channel 54.

The chamber 51 which can be made to connect to axial inlet pipe 50 through chamber channel 54 is formed in the annular space between the inside of the a portion of the housing of handle section 30 and the outside surface of axial inlet pipe 50, which can best be seen in FIG. 1. As can be seen in FIGS. 1 and 3, the posterior end of chamber 51 is hydraulically connected to outlet 42 through a chamber/outlet channel 53 (FIG. 3) and can be alternately hydraulically connected to and disconnected from axial inlet pipe 50 (FIG. 1).

The switching of the various hydraulic connections is effected by any suitable means such as by depressing or releasing a trigger 56 which may be operated by the thumb or finger of the user, or by any other convenient means. Trigger 56 is connected to a triggering rod 58 which is biased radially outward by a spring 60.

The function and principles of a device according to the present invention is next explained in the context of a description of the operation of the system.

Shown in FIGS. 1 and 2 is the system in its neutral, or rest, position. In this position, which is preferably the default status of the device, and which typically lasts from a few seconds to several minutes and does not require the expenditure of energy, blades 10 and 12 are apart, ready to accept branch or limb 11 for cutting. In this condition, essentially no power is required by the tool. As can be seen from FIG. 1, with the device in this state, inlet 40 and outlet 42 are hydraulically connected to each other. Furthermore, outlet 42, chamber 51 and the chamber defined by the combined volume of piston reservoir 48 and axial inlet pipe 50 are all hydraulically connected so that the hydraulic pressure is constant throughout.

Under these conditions, piston 46 is being urged anteriorly by hydraulic pressure in chamber 51 and in axial inlet pipe 50 and is being urged posteriorly by hydraulic pressure in piston reservoir 48 and in a secondary chamber 55. Since the pressure is constant throughout and since the combined effective projected area relative to piston 46 of chamber 51 and axial inlet pipe 50 is larger than the combined effective projected area relative to piston 46 of piston reservoir 48 and secondary chamber 55, piston 46 is continuously urged forward, so that blades 10 and 12 remain apart. Thus, the back pressure of the system is used to place and keep the blades in their open position, ready to admit a branch to be cut.

Once the operator has maneuvered the tool so as to properly locate branch or limb 11 between blades 10 and 12 (FIG. 2), he pulls trigger 56 thereby initiating the power stroke during which blades 10 and 12 are made to close forcefully. The pulling of trigger 56 serves to virtually instantaneously switch the hydraulic connections as described below, and as can be seen by comparing FIGS. 1 and 3.

Upon depressing trigger 56 inlet 40 and outlet 42 are hydraulically disconnected from each other. Instead, inlet 40 is connected to axial inlet pipe 50. Outlet 42 remains connected to chamber 51. At the same time, chamber 51 and axial inlet pipe 50 are disconnected from each other.

The switching of the hydraulic connections creates a large pressure differential between the low pressure in chamber 51 and the high pressure in piston reservoir 48, in secondary chamber 55 and in axial inlet pipe 50.

Under these conditions, piston 46 is effectively not being urged anteriorly because of the very low hydraulic pressure in chamber 51. At the same time, piston 46 is being urged anteriorly by the high hydraulic pressure in axial inlet pipe 50 and is being urged posteriorly by the same high hydraulic pressure in piston reservoir 48 and also be the high pressure in secondary chamber 55. Since the effective projected area relative to piston 46 of axial inlet pipe 50 is considerably smaller than the combined effective projected area of piston reservoir 48 and secondary chamber 55, piston 46 is forcefully urged posteriorly, so that blades 10 and 12 come together in a powerful cutting motion (FIGS. 3 and 4).

At the end of the power stroke, trigger 56 is released, thereby reconnecting inlet 40 and outlet 42 and the two chambers, thereby equalizing the pressure of all the internal chambers so as to cause the internal back pressure to urge piston 46 anteriorly, thereby quickly and efficiently causing blades 10 and 12 to open, as described in detail above.

A slight variation of the system shown in the embodiment of FIGS. 1–4 is depicted in FIGS. 5 and 6 which illustrate a closed system hydraulic pruning tool according to the present invention, before the start of the power stroke. In a closed system the hydraulic inlet and outlet are never in direct hydraulic communication with each other, as will be described in more detail below.

The closed system arrangement is the same as that described with reference to the embodiment of FIGS. 1–4 except that inlet 40 and outlet 42 are always hydraulically isolated from each other, which is depicted symbolically by the inclusion of a plug 90 shown in FIG. 5 as blocking inlet/outlet bypass 44. The rest of the system is as described with reference to the basic open hydraulic system embodiment of FIGS. 1–4. It is to be noted that during the power stroke the hydraulic connections are exactly as described above with reference to the open system configuration, while during the reset stroke and the time between the end of the reset stroke and the beginning of the next power stroke the hydraulic connections in the two cases differ in that inlet 40 and outlet 42 are not connected to each other and chamber 51 and the chamber defined by the combined volume of piston reservoir 48 and axial inlet pipe 50 are all hydraulically connected to each other and to inlet 40 so that the hydraulic pressure is constant throughout.

While the invention has been described with respect to a limited number of embodiments, it will be appreciated that many variations, modifications and other applications of the invention may be made.

What is claimed is:

1. A hydraulic tool for alternately producing a relatively strong power stroke and a relatively weak reset stroke, comprising:
   (a) a housing;
   (b) a reciprocating member slidable within said housing such that during the power stroke said reciprocating member slides in a first direction and during the reset stroke said reciprocating member slides in a direction which is opposite said first direction;
   (c) a hydraulic inlet;
   (d) a hydraulic outlet, said outlet being hydraulically connected to said inlet during the reset stroke and during the time between the end of the reset stroke and the beginning of the next power stroke, said outlet being hydraulically disconnected from said inlet during the power stroke;
   (e) a first chamber, having a first chamber effective projected area for applying pressure to said reciprocating member, said first chamber being hydraulically connected to said outlet; and
   (f) a second chamber, having a second chamber effective projected area for applying pressure to said reciprocating member which is smaller than said first chamber effective projected area, said second chamber being hydraulically connected to said inlet and hydraulically disconnected from said outlet during the power stroke, said second chamber being hydraulically disconnected from said first chamber during the power stroke and hydraulically connected to said first chamber during the reset stroke and during the time between the end of the reset stroke and the beginning of the next power stroke, such that during the power stroke said reciprocating member is urged in said first direction and during the reset stroke said reciprocating member is urged in a direction which is opposite that of said first direction.

2. A hydraulic tool as in claim 1 further comprising a pruning head activated by said reciprocating member.

3. A hydraulic tool as in claim 2 wherein said pruning head includes an elongate pruning head support member and a pair of blade members, said blade members being located so as to admit between them a branch or limb such that the center of the branch or limb lies substantially along the centerline of said pruning head support member.

4. A hydraulic tool as in claim 2 wherein the tool includes a handle section and a swivel section rotatable relative to said handle section, said swivel section being rigidly connected to said pruning head such that rotation of said swivel section relative to said handle section brings about the rotation of said pruning head relative to said handle section.

5. A hydraulic tool for alternately producing a relatively strong power stroke and a relatively weak reset stroke, comprising:
   (a) a housing;
   (b) a reciprocating member slidable within said housing such that during the power stroke said reciprocating member slides in a first direction and during the reset stroke said reciprocating member slides in a direction which is opposite said first direction;
   (c) a hydraulic inlet;
   (d) a hydraulic outlet;
   (e) a first chamber, having a first chamber effective projected area for applying pressure to said reciprocating member, said first chamber being hydraulically connected to said outlet during the power stroke and hydraulically disconnected from said outlet and hydraulically connected to said inlet during the reset stroke and during the time between the end of the reset stroke and the beginning of the next power stroke; and
   (f) a second chamber, having a second chamber effective projected area for applying pressure to said reciprocating member which is smaller than said first chamber effective projected area, said second chamber being hydraulically connected to said inlet, said second chamber being hydraulically disconnected from said first chamber during the power stroke and hydraulically connected to said first chamber during the reset stroke and during the time between the end of the reset stroke and the beginning of the next power stroke, such that during the power stroke said reciprocating member is urged in said first direction and during the reset stroke said reciprocating member is urged in a direction which is opposite that of said first direction.

6. A hydraulic tool as in claim 5 further comprising a pruning head activated by said reciprocating member.

7. A hydraulic tool as in claim 6 wherein said pruning head includes an elongate pruning head support member and a pair of blade members, said blade members being located so as to admit between them a branch or limb such that the center of the branch or limb lies substantially along the centerline of said pruning head support member.

8. A hydraulic tool as in claim 6 wherein the tool includes a handle section and a swivel section rotatable relative to said handle section, said swivel section being rigidly connected to said pruning head such that rotating of said swivel section relative to said handle section brings about the rotation of said pruning head relative to said handle section.

* * * * *
* * * * *